United States Patent Office 2,857,394
Patented Oct. 21, 1958

2,857,394

HETEROCYCLIC COMPOUNDS

George de Stevens, New Providence, N. J., assignor to Ciba Pharmaceutical Products, Inc., Summit, N. J., a corporation of New Jersey No Drawing. Application May 10, 1957
Serial No. 658,247

5 Claims. (Cl. 260—307)

This invention relates to 4-oxazoline-2-ones. More particularly, the invention is concerned with 3-R-4,5-alkylene-4-oxazoline-2-ones and the process for the preparation thereof.

In the 3-R-4,5-alkylene-4-oxazoline-2-ones of this invention R represents hydrogen or an organic radical, primarily an unsubstituted lower hydrocarbon radical containing from 1 to 8 carbon atoms such as a lower alkyl radical, e. g. methyl, ethyl, propyl or isopropyl; a lower alkenyl radical, e. g. vinyl or allyl; a lower cycloalkyl radical, e. g. cyclopentyl or cyclohexyl; a lower cycloalkyl-lower alkyl radical, e. g. cyclohexylethyl or cyclopentyl propyl; a monocyclic aryl radical such as phenyl; or an arakyl radical, e. g. benzyl or phenylethyl. Furthermore, R stands for substituted lower hydrocarbon radicals such as for example those substituted by nitro, amino or hydroxyl groups or halogen atoms. Especially contemplated are tertiary aminoalkyl radicals, the alkyl radical of which is represented by the 1,2-ethylene, 1,2-propylene or the 1,3-propylene radical and the tertiary amino group of which is an N,N-di-lower alkyl amino group, the alkyl radicals of which contain from 1 to 8 carbon atoms, e. g. dimethylamino, diethylamino, dipropylamino, diisopropylamino, or dibutylamino groups, or an N,N-lower alkyleneimino group, the alkylene chain of which contains 4 to 6 carbon atoms which may be arranged in a straight carbon chain or may be interrupted by hetero-atoms such as oxygen, sulfur or nitrogen; such groups may be represented by pyrrolidino, piperidino, 2-methylpiperidino, hexamethyleneimino, morpholino, thiamorpholino, piperazino, N-methyl-piperazino or N-hydroxyethylpiperazino groups. Hydroxyl groups, free, etherified or esterified, are particularly attached to lower alkyl radicals, whereas nitro groups or halogen atoms are mainly substituents of aromatic radicals.

Although the 4,5-alkylene radical is preferably unsubstituted and contains from 3 to 5 ring carbon atoms, it may contain lower hydrocarbon radicals as substituents, for example, lower alkyl radicals, e. g. methyl or ethyl; lower cycloalkyl radicals, e. g. cyclopentyl or cyclohexyl; monocarbocyclic aromatic radicals, e. g. phenyl; or lower alkylene radicals which may be attached to the saturated ring to form a fused-on ring or an endo or spiro ring.

3-R-4,5-alkylene-4-oxazoline-2-ones, in which R contains a salt-forming group, for example, an amino group, may be obtained in the form of their salts, such as their therapeutically useful acid addition salts with inorganic acids, e. g. hydrochloric, hydrobromic, thiocyanic acid, sulfuric or phosphoric acid; or with organic acids, e. g. acetic, propionic, lactic, malonic, maleic, malic, tartaric or citric acid.

3-R-4,5-alkylene-4-oxazoline-2-ones in which R is a substituent containing a tertiary amino group, may also be obtained in the form of their quaternary ammonium compounds, particularly as lower alkyl halides, e. g. methiodides, methobromides, methochlorides or ethobromides or di-lower alkylsulfates, e. g. dimethyl- or diethylsulfates; or the corresponding hydroxides.

The new compounds of this invention exhibit analgesic activity and can be used for the alleviation of pain. Especially valuable with respect to the analgesic activity are 3-R-4,5-alkylene-4-oxazoline-2-ones in which R stands for hydrogen or a lower alkyl group, e. g. ethyl, isopropyl or particularly methyl, and in which the cycloalkano ring contains from 5 to 7 carbon atoms in the ring. Representing this group is the 4,5-tetramethylene-4-oxazoline-2-one or 4,5,6,7-tetrahydro-benzoxazolone of the formula:

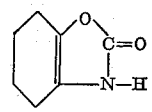

and its 3-methyl derivative of the formula:

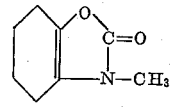

The new compounds can be used as medicaments in the form of pharmaceutical preparations, which contain the new compounds in admixture with a pharmaceutical, organic or inorganic solid or liquid carrier suitable for enteral or parenteral administration. For making up the preparations there can be employed substances which do not react with the new compounds, such as water, gelatine, lactose, starches, magnesium stearate, talc, vegetable oils, benzyl alcohols, gums, polyalkylene glycols, petroleum jelly, or any other known carrier for medicaments. The pharmaceutical preparations may be, for example, in the form of tablets or dragees or in liquid form as solutions. If desired, they may contain auxiliary substances, such as preserving agents, stabilizing agents, salts for varying the osmotic pressure or buffers. They may also contain, in combination, other therapeutically useful substances. The new compositions contain preferably from about 0.5 mg. to about 500 mg. of the new active compounds per dosage unit. The actual dose administered in therapy depends largely on the condition of the individual patient and the desires of the practicing physician.

The new 4-oxazoline-2-ones of this invention may be prepared by treating the monomer of a 2-hydroxy-cycloalkanone, the cycloalkano ring of which contains from 5 to 7 carbon atoms and may be unsubstituted or substituted, as outlined hereinbefore, with an ester of an N-R-carbamic acid, and, if desired, replacing any hydrogen attached to the ring nitrogen atom of the resulting 4-oxazoline-2-one with an organic radical such as those outlined hereinbefore.

A preferred embodiment of this invention consists of treating the monomer of a 2-hydroxy-cycloalkanone, the cycloalkanone of which contains from 5 to 7 carbon atoms with a lower alkyl N-R-carbamate, in which R stands for hydrogen or lower alkyl; for example, the monomer of 2-hydroxy-cyclohexanone may be reacted with ethyl carbamate in the presence of catalytic amounts of pyridine to produce the 4,5-tetramethylene-4-oxazoline-2-one.

In an N-R-carbamic acid, R represents hydrogen or an organic radical as outlined hereinbefore, especially an alkyl radical; esters of carbamic acid are especially those with a lower alkanol, e. g. methanol, ethanol, propanol, isopropanol, butanol, isobutanol, pentanol, or isopentanol, or with an arylalkanol, e. g. benzyl-alcohol.

The reaction is preferably carried out in the presence of an organic base in catalytic amounts. Such an organic base may be for example an organic base containing a primary, secondary or more especially a tertiary nitrogen atom such as for example trimethylamine, dimethylethylamine, triethylamine, collidine, lutidine, piperidine or especially pyridine.

The condensation may be carried out in the absence or presence of a diluent such as an alcoholic solvent, e. g. methanol, ethanol, propanol, butanol, pentanol or isopentanol; or a formamide solvent, e. g. formamide or dimethyl formamide; preferably at an elevated temperature, e. g. from about 80° to about 250°; at atmospheric pressure or elevated pressure in a closed vessel, especially when low boiling solvents are used; and, if desired, in the atmosphere of an inert gas, e. g. nitrogen.

In the resulting 4,5-alkylene-4-oxazoline-2-ones which are unsubstituted in the 3-position organic radicals such as those outlined above, there may be introduced by conventional methods, e. g. by reaction of the 4-oxazoline-2-one unsubstituted in the 3-position with a reactive ester formed by an organic radical containing a hydroxyl group with a strong acid. Such organic radicals are more especially the lower hydrocarbon radicals outlined hereinbefore which contain a reactive halogen atom, e. g. chlorine, bromine or iodine, for example, methyl iodide, methyl bromide, methyl chloride, ethyl-bromide, propyl chloride, isopropyl chloride, benzyl chloride, phenylethyl bromide, etc., or those hydrocarbon radicals which contain in addition to the reactive halogen atom other substituents as outlined hereinbefore, such as, for example, a nitro, an amino or a hydroxyl group or non-reactive halogen atoms. Furthermore, esterified aryl sulfonic acids may be used as reagents to replace the hydrogen attached to the ring nitrogen atom, especially lower alkyl aryl sulfonates, e. g. methyl p-toluene sulfonate. Di-lower hydrocarbon sulfates may also be employed for the same purpose, for example, di-lower alkyl sulfates, e. g. dimethylsulfate or diethylsulfate.

For the purpose of replacing the hydrogen attached to the nitrogen atom of the 4-oxazoline-2-one ring by an organic radical, the 4,5-alkylene-4-oxazoline-2-ones are preferably used in the form of their metal salts, e. g. alkali metal salts such as sodium or potassium salts, or in the presence of agents capable of forming such salts or in the presence of strongly basic condensing agents, such as alkali metal hydroxides, e. g. sodium or potassium hydroxide, or trimethyl benzyl ammonium hydroxide. The alkali metal salts may be obtained, for example, by treatment of the 4-oxazoline-2-one with amides, hydrides or alcoholates of alkali metals such as sodium or potassium amide, sodium hydride, or sodium or potassium methylate, ethylate, propylate or isopropylate. The introduction of the organic radical is conveniently carried out in a diluent such as an aromatic hydrocarbon, e. g. benzene or toluene, or a lower alkanol, e. g. methanol, ethanol or propanol.

Furthermore, organic radicals R in the resulting 3-R-4,5-alkylene-4-oxazoline-2-ones may subsequently be modified. For example, a nitro group may be reduced to an amino group, especially by catalytic hydrogenation, e. g. by treatment with hydrogen in the presence of a catalyst such as, for example platinum oxide or Raney nickel.

Depending on the reaction conditions the 3-R-4,5-alkylene-4-oxazoline-2-ones in which R stands for a substituent containing a salt-forming group, such as an amino group, may be obtained in the form of the free bases or as the salts thereof. Salts may be converted into the free bases, for example, by reaction with an alkaline reagent, e. g. sodium or potassium hydroxide. Free bases may be transformed into their therapeutically useful acid addition salts by reaction with the appropriate inorganic or organic acids such as outlined hereinbefore, for example in the alcoholic, e. g. ethanolic solution.

3-R-4,5-alkylene-4-oxazoline-2-ones, in which R stands for a substituent containing a tertiary amino group, may be converted into the quaternary ammonium compounds by reacting the tertiary bases, for example, with a lower alkyl halide, e. g. methyliodide, methylbromide, methyl chloride or ethylbromide, or a di-lower alkylsulfate, e. g. dimethyl or diethyl sulfate. The quaternizing reaction is preferably performed in the presence of a solvent such as an alkanol, e. g. methanol or ethanol; or an alkanoic acid amide, e. g. formamide or dimethylformamide.

The invention also comprises any modification of the general process wherein a compound obtainable as an intermediate at any stage of the process is used as starting material and the remaining steps of the process are carried out, as well as any new intermediates.

In the process of this invention such starting materials are preferably used which lead to the final products mentioned in the beginning as preferred embodiments of the invention. The preparation of such starting materials is known or may be carried out according to processes known for the preparation of closely related compounds. Thus, the monomer of 2-hydroxy-cycloalkanones, such as, for example, the monomer of 2-hydroxy-cyclohexanone, may be prepared by reacting a 2-halogeno-cycloalkanone, e. g. 2-chloro-cyclohexanone with an aqueous solution of potassium carbonate, and distilling the resulting dimer, e. g. the dimer of 2-hydroxy-cyclohexanone, to recover the desired monomer of 2-hydroxy-cyclo-alkanone, e. g. the monomer of 2-hydroxy-cyclohexanone, which is used immediately in the process of the invention.

The starting materials used in this process may also be formed during the process of preparing the compounds of this invention where conditions apply which convert them into the desired end products according to the above-described process.

The following examples are intended to illustrate the invention and are not to be construed as a limitation thereon. Temperatures are given in degrees centigrade.

*Example 1*

To a mixture of 17 g. of freshly prepared monomer of 2-hydroxy-cyclohexanone and 32 g. of ethyl carbamate in 350 ml. of dimethylformamide is added 0.5 ml. of pyridine and the solution is refluxed for 20 hours. After distilling off the solvent the residue is distilled under reduced pressure. Unreacted ethyl carbamate distills at 94–96°/0.3 mm. and the additional distillate of 120–160°/0.3 mm. is collected and redistilled. The 4,5-tetramethylene-4-oxazoline-2-one or 4,5,6,7-tetrahydro-benzoxazolone of the formula:

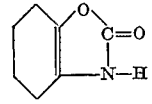

boils at 140°/0.3 mm. The product is dissolved in ethanol and after the addition of ether crystals are obtained, which after washing with petroleum ether melts at 128–130°.

The monomer of the 2-hydroxy-cyclohexanone used as the starting material may be prepared as follows: A mixture of 150 g. of 2-chlorocyclohexanone and 450 g. of sodium carbonate in 750 ml. of water is stirred for 18 hours at room temperature. The resulting crystals are filtered off and recrystallized from ethanol. The thus obtained dimer of 2-hydroxy-cyclohexanone is distilled, B. P. 84°/19 mm., into a preheated flask, and the resulting monomer is immediately used in the reaction with ethyl carbamate.

Instead of using the monomer of 2-hydroxy-cyclohexanone the corresponding 2-hydroxy-cyclopentanone and -cycloheptanone may be used in the reaction to produce the corresponding 4,5-trimethylene- or 4,5-pentamethylene-4-oxazoline-2-ones.

*Example 2*

3.3 g. of 4,5-tetramethylene-4-oxazoline-2-one obtained according to the process described in Example 1 is refluxed for 10 minutes in a solution of 0.57 g. of sodium in 150 ml. of ethanol. 3.3 g. of methyliodide is added and the mixture is refluxed for an additional 8 hours. The solvent is stripped off under reduced pressure, the residue extracted with benzene, the benzene evaporated and the residue distilled, B. P. 120–123°/0.35 mm.

The distillate is recrystallized from ether, M. P. 92–93°, yielding the 3-methyl-4,5-tetramethylene-4-oxazoline-2-one of the formula:

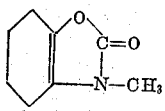

Instead of using methyliodide other hydrocarbon halides, such as ethyliodide, benzylchloride, etc. may be used to produce 3-lower hydrocarbon substituted 4,5-tetramethylene-4-oxazoline-2-ones, such as the 3-ethyl- or the 3-benzyl-4,5-tetramethylene-4-oxazoline-2-one.

Example 3

A mixture of the monomer of 2-hydroxy-cyclohexanone and ethyl N-methyl-carbamate in propanol and a few drops of collidine may be refluxed and the reaction product worked up according to the procedure given in Example 1. The resulting 3-methyl-4,5-tetramethyl-4-oxazoline-2-one is identical with the product described in Example 2.

Furthermore, the new 3-R-4,5-alkylene-4-oxazoline-2-ones of this invention may be prepared by modifying the generally applicable principle of treating together compounds of the formula:

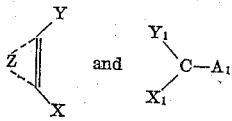

or their tautomeric isomers, whereby care has to be taken that in compounds of the first formula the monomeric form is used. In such formulae Z represents an alkylene chain as outlined hereinbefore, $A_1$ stands for an oxo group or a substituent which under the reaction conditions is converted into the oxo group, and in which X and $X_1$ react together with the formation of the grouping

R standing for hydrogen or an organic radical as outlined hereinbefore, and Y and $Y_1$ react together with the formation of the grouping —O—, and, if desired, converting any resulting 4,5-alkylene-4-oxazoline-2-one unsubstituted in the 3-position into the corresponding 4-oxazoline-2-one substituted in the 3-position by an organic radical. X, $X_1$, Y and $Y_1$ may be appropriately selected according to general chemical knowledge from free or reactive esterified or etherified hydroxyl groups, free of functionally converted oxo groups or R-N-substituted amino groups, R having the meaning given above. Esterified hydroxyl groups are especially those esterified with a strong inorganic or organic acid such as a hydrohalic acid, e. g. hydrochloric acid; or an organic sulfonic acid, e. g. p-toluene sulfonic acid. Etherified hydroxyl groups are especially lower alkoxy groups such as methoxy, ethoxy, propoxy, or butoxy groups. Functionally converted oxo groups are especially ketalized oxo groups such as ethylenedioxy groups. A substituent $A_1$, which under the reaction conditions may be converted into an oxo group, is represented by a lower alkoxy group, e. g. methoxy, ethoxy, propoxy, or butoxy group.

In these compounds hydrogen atoms being part of the substitutents $A_1$, X, $X_1$, Y and $Y_1$ may give rise to tautomerism by shifting to a neighboring atom, thus accommodating the double bonds in the above formulae provided that the reactivity of the compounds involved is not affected.

Thus, instead of using an ester of an N-R-carbamic acid the corresponding halide, e. g. chloride, may be reacted with the monomer of a 2-hydroxy-cycloalkanone. Or, a 2-amino-cycloalkanone or a 2-acylated amino-cycloalkanone may be reacted with phosgene to produce the desired 4-oxazoline-2-one. Furthermore, a 2-amino-cycloalkanone may be reacted with a lower alkyl halo-carbonate, e. g. ethyl chlorocarbonate, to form the corresponding carbethoxyamino derivative or the enol thereof, which may be ring closed by splitting of alkanol, e. g. ethanol.

These reactions are preferably carried out in the presence of a base in catalytic amounts or amounts to neutralize generated acid, such as an organic base, e. g. those outlined hereinbefore.

Furthermore, 3-R-4,5-alkylene-4-oxazoline-2-ones, in which R has the above-given meaning may be obtained by converting in compounds of the formulae:

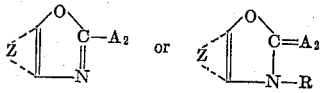

in which Z stands for an alkylene chain, and $A_2$ for a substituent convertible into an oxo group, such a substituent $A_2$ into an oxo group, and, if desired, converting any resulting 4,5-alkylene-4-oxazoline-2-one unsubstituted in the 3-position into the corresponding 4-oxazoline-2-one substituted in the 3-position by an organic radical. A substituent $A_2$ may be, for example, an esterified hydroxyl group such as a hydroxyl group esterified by a strong inorganic acid, represented, for example, by a halogen atom, e. g. chlorine; an amino group, e. g. amino or anilino; an imino group, e. g. imino or phenylimino; an etherified hydroxyl group such as a lower alkoxy group, e. g. methoxy, ethoxy, propoxy or butoxy; or an unsubstituted or substituted methylene group. In the starting material, hydrogen atoms being part of the substituent $A_2$ or of a group formed in the course of the reaction or attached to the ring nitrogen atom may give rise to tautomerism by shifting to a neighboring atom thus accommodating the double bond.

Etherified hydroxyl groups, such as lower alkoxy groups, or esterified hydroxyl groups such as halogen atoms, may be hydrolyzed in the usual manner, e. g. by treatment with alkali or strong acids respectively. If the esterified hydroxyl group is a halogen atom, e. g. chlorine or bromine, it may be converted directly into the oxo group by treatment with metal hydroxides, for example, silver hydroxide, or may be first converted into an etherified hydroxyl group such as an alkoxy group, e. g. methoxy or ethoxy by treatment with a metal alcoholate, e. g. sodium methylate or ethylate. The alkoxy group is then split, for example, by treatment with hydrochloric acid. These steps can also be combined by treating a 2-halogeno-4,5-alkylene-oxazole with the desired alcohol and a strong acid, such as ethanol and hydrochloric acid. The conversion of the alkoxy group into the oxo group may also be accomplished by isomerization of a corresponding 2-alkoxy-oxazole derivative under simultaneous alkylation of the nitrogen atom, for example, by treatment with an alkyl halide, e. g. methyliodide.

A free amino group may be diazotized with nitrous acid and then decomposed, for example, by treatment with phosphoric acid or by heating in a high boiling solvent, e. g. xylene. Furthermore, a free amino group may be diazotized and the diazo compound decomposed in the presence of a cupric halide, e. g. chloride, and the halogen, e. g. chlorine, atom thus introduced may be converted into the oxo group according to the above-described method. Furthermore, a 2-amino-4,5-alkylene-oxazole may be converted into a 2-imino-3-R-4,5-alkylene-4-oxazoline, in which R stands for an organic radical, especially lower alkyl, e. g. methyl, by treatment with an R-halide, especially a lower alkyl halide, e. g. methyliodide. After nitrosation of the 2-imino-compound with nitrous acid, formed by reacting an alkali metal nitrite, e. g. sodium nitrite, with a lower alkanoic acid, e. g. glacial acetic acid, the 2-nitrosoimino-3-R-4,5-alkylene-4-oxazoline is decomposed at a temperature ranging from about 50° C. to about 250° C., preferably in a high-boiling solvent, such as an aromatic hydrocarbon, e. g. xylene, and yields directly the 3-R-4,5-alkylene-4-oxazoline-2-one, in which R stands for an organic radical, especially lower alkyl, e. g. methyl.

A free amino group or a substituted amino group such as, for example, an anilino group, may be converted into the oxo group by treatment with a hydrolyzing agent, e. g. a strong acid such as sulfuric acid in ethanolic solution. Furthermore, a substituted imino group such as the phenylimino group undergoes the same hydrolysis; upon treatment with hydrochloric acid in ethanol the desired 4-oxazoline-2-one is formed.

An unsubstituted or substituted methylene group in 2-position may be oxidatively degraded to the oxo groups, e. g. by treatment with chromic acid. A substituted methylene group is more especially the dicarbalkoxymethylene group.

What is claimed is:

1. 3-R-4,5-alkylene-4-oxazoline-2-ones in which R stands for a member of the group consisting of hydrogen and a lower alkyl radical, and in which the alkalene radical contains from 3 to 5 carbon atoms.

2. 4,5-alkylene-4-oxazoline-2-one, the alkylene radical of which contains 3 to 5 carbon atoms.

3. 4,5-tetramethylene-4-oxazoline-2-one.

4. 3-lower alkyl-4,5-alkylene - 4 - oxazoline - 2 - one in which the alkylene radical contains from 3 to 5 carbon atoms.

5. 3-methyl-4,5-tetramethylene-4-oxazoline-2-one.

References Cited in the file of this patent

Mousseron et al.: Chem. Abstracts, vol. 49, column 885 (1955).

Elderfield: Heterocyclic Compounds, vol. 5, pages 440–1 (1957) (citing Desai et al., J. Chem. Soc., 1938, page 321).